(12) United States Patent
Khayrallah et al.

(10) Patent No.: US 7,929,985 B2
(45) Date of Patent: Apr. 19, 2011

(54) MULTIPLE ANTENNA RECEIVER

(75) Inventors: Ali Khayrallah, Cary, NC (US); Tracy Fulghum, Durham, NC (US); Nikolaus Klemmer, Apex, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2151 days.

(21) Appl. No.: 10/427,872

(22) Filed: May 1, 2003

(65) Prior Publication Data
US 2004/0219959 A1 Nov. 4, 2004

(51) Int. Cl.
*H04M 1/00* (2006.01)
(52) U.S. Cl. .................. 455/550.1; 455/553.1; 455/574
(58) Field of Classification Search .................. 455/504, 455/506, 65, 550.1, 553.1, 574
See application file for complete search history.

(56) References Cited

U.S. PATENT DOCUMENTS

| | | | |
|---|---|---|---|
| 4,715,048 A | 12/1987 | Masamura | |
| 5,263,180 A * | 11/1993 | Hirayama et al. | ............ 455/139 |
| 5,805,989 A * | 9/1998 | Ushida | ........................ 455/343.2 |
| 5,892,483 A | 4/1999 | Hayes et al. | |
| 5,960,330 A | 9/1999 | Azuma | |
| 5,966,646 A | 10/1999 | Lampe et al. | |
| 5,983,086 A * | 11/1999 | Tsukuda | ........................ 455/132 |
| 6,023,615 A | 2/2000 | Bruckert et al. | |
| 6,157,836 A * | 12/2000 | Cashman | ........................ 455/436 |
| 6,172,970 B1 * | 1/2001 | Ling et al. | ........................ 370/347 |
| 6,240,301 B1 | 5/2001 | Phillips | |
| 6,360,089 B1 * | 3/2002 | Saitoh | ........................ 455/343.1 |
| 6,473,601 B1 * | 10/2002 | Oda | ............................... 455/132 |
| 6,748,212 B2 * | 6/2004 | Schmutz et al. | ............... 455/424 |
| 6,862,433 B2 * | 3/2005 | Callaway, Jr. | .................. 455/101 |
| 6,965,788 B1 * | 11/2005 | Barratt et al. | .................. 455/574 |
| 7,146,134 B2 * | 12/2006 | Moon et al. | ................. 455/67.11 |
| 2003/0072396 A1 | 4/2003 | Binshtok et al. | |

FOREIGN PATENT DOCUMENTS

EP 1045531 10/2000
WO WO 00/11806 3/2000

* cited by examiner

*Primary Examiner* — Yuwen Pan
(74) *Attorney, Agent, or Firm* — Coats & Bennett, P.L.L.C.

(57) ABSTRACT

A wireless communication device includes at least two antennas with at least two corresponding receive chains. Selectively activating and deactivating the receivers as needed for a desired quality of reception controls the performance and power consumption of the wireless communication device. The wireless communication device may operate in a single receiver mode or a dual receiver diversity mode. In the dual receiver diversity mode, the wireless communication device may selectively control the gain of one or more antennas and/or reconfigure one or more receive chains to minimize power consumption while maintaining a desired performance.

27 Claims, 8 Drawing Sheets

MULTIPLE ANTENNA RECEIVER

BACKGROUND OF THE INVENTION

The present invention relates to wireless communication, and more particularly to wireless communication devices with multiple antennas and receivers.

Mobile communication devices or terminals are becoming ubiquitous in modern society. Typical mobile communication devices include pagers, personal digital assistants, mobile phones, and the like, however, all such devices shall be referred to herein as mobile terminals. Consumers that use mobile terminals as part of their every day activities have three primary concerns: size and weight, performance, and battery life. Consumers that carry two or more mobile communications devices, such as a pager and a mobile phone, want the devices to be as small and unobtrusive as possible. As a result, there is increasing pressure to shrink the mobile terminal and its internal components.

Further, consumers demand that their mobile terminals provide adequate reception for their needs. A common problem associated with wireless communications is that the transmitted signals are sometimes lost or distorted because of multipath fading and interference. One known method of reducing interference and multipath fading is to use a plurality of antennas, and more preferably a plurality of receivers. Thus, the mobile terminal may include two receiver circuits, which are then utilized together using interference cancellation or other known performance enhancing techniques to provide a clear audio signal for the user in the case of a voice call and improved data throughput in the case of a data call. However, this dual receiver methodology is also in direct conflict with the goal of size reduction.

Lastly, consumers are very concerned about the battery capacity of the mobile terminals, and especially the operating time that the battery provides before it needs to be recharged. However, this concern is at odds with the desire to miniaturize the mobile terminals and the desire to improve reception with a plurality of antennas and receivers. The additional circuitry adds a drain on the battery, thereby increasing the frequency of recharging and/or the size of the battery. While advances have been made in the size and weight of the battery, pressures to make the mobile terminals smaller and lighter have frequently exceeded the ability of the battery designers to produce a battery that supplies the needed power for the desired long interval between recharging while fitting within the condensed mobile terminal.

Therefore, there is a need for manufacturers of mobile terminals to improve the performance of mobile devices while still conserving energy.

SUMMARY OF THE INVENTION

The present invention discloses a method and apparatus for selectively improving the performance of a portable wireless device. The portable wireless device includes a front-end and a front-end controller. The front-end includes a primary antenna connected to a primary receiver and a secondary antenna connected to a secondary receiver. The front-end controller selectively couples the second antenna to the secondary receiver and selectively varies the gain of the secondary receiver based on one or more channel quality indicators.

DETAILED DESCRIPTION OF THE INVENTION

Figure 1:
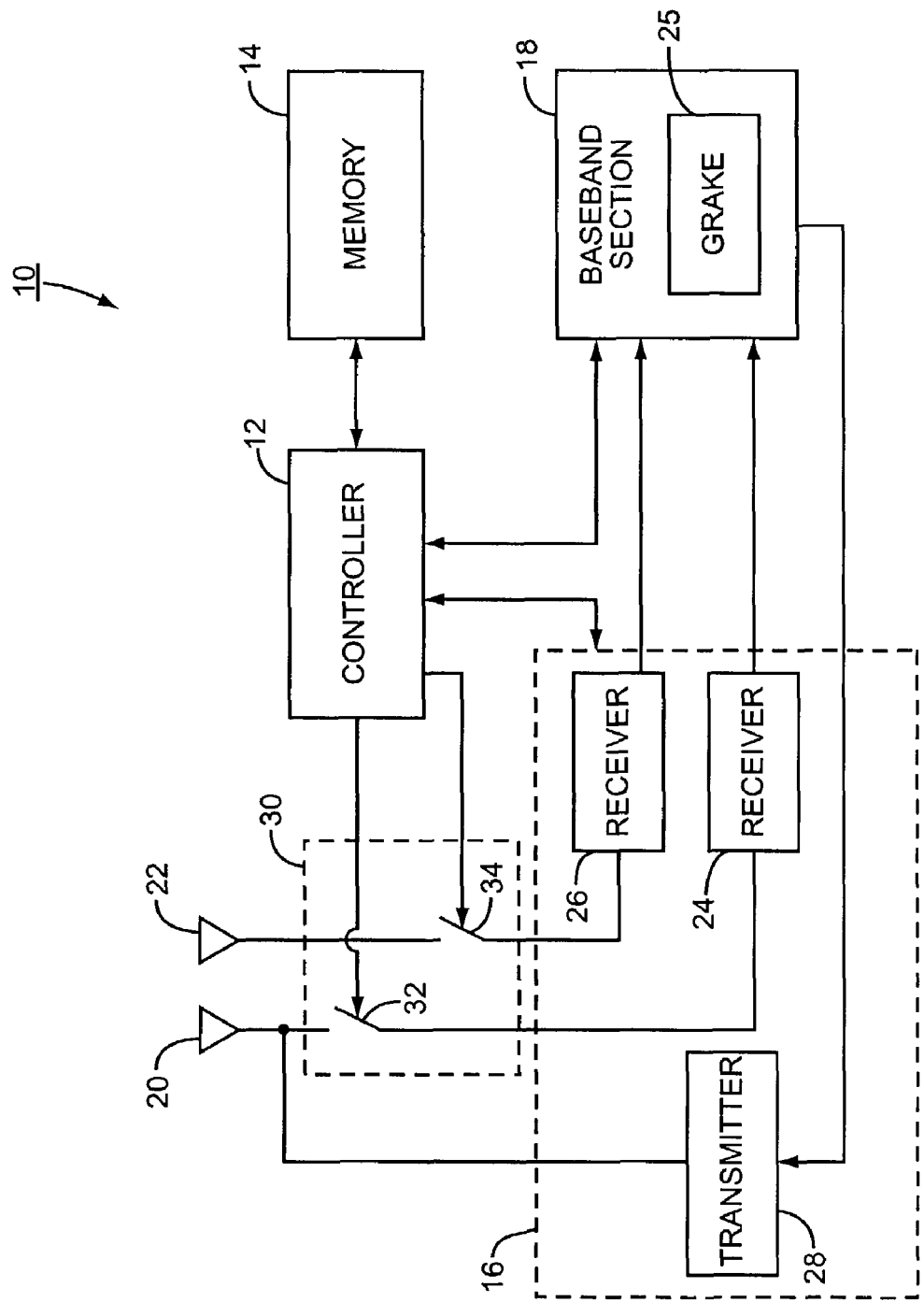
FIG. 1 illustrates a top-level block diagram of a mobile terminal according to the present invention.

FIG. 1 is a block diagram of a mobile terminal 10 made according to the present invention. While adaptable to a myriad of mobile communication devices or terminals such as pagers, personal digital assistants and the like, the present invention is particularly well suited for use in cellular telephones. Mobile terminal 10 includes controller 12, memory 14, transceiver section 16, baseband processing section 18, a pair of diversity antennas 20, 22, and switching unit 30. Controller 12 controls the operation of mobile terminal 10 according to program instructions stored in memory 14. Controller 12 may comprise a single dedicated processor or, alternately, may comprise multiple processors, each performing different control functions. Memory 14 represents the hierarchy of memory normally present in a mobile terminal 10. Memory 14 stores the operating system programs and data used by mobile terminal 10 to control operation of mobile terminal 10. Memory 14 may also store application programs and user data.

In the exemplary embodiment of FIG. 1, transceiver section 16 comprises first receiver 24, second receiver 26, and transmitter 28. Transmitter 28 is operatively connected to antenna 20 and operates in a conventional manner. Receivers 24, 26 are connected to respective antennas 20, 22 via switching unit 30 and receive electromagnetic waves representative of a signal transmitted over a communication channel. Controller 12 selectively actuates switches 32, 34, and controls receivers 24, 26 to select the desired operating mode, as will be described in more detail below. Receivers 24, 26 process the received electromagnetic waves and extract the received signal in a conventional manner. In dual receiver diversity mode, receivers 24, 26 process the received electromagnetic waves concurrently and extract the received signal in a redundant manner such that the same received signal is extracted separately by each receiver 24, 26. It will be appreciated by those skilled in the art that the signal may comprise any desired information, such as voice or data information or control signals.

Baseband section 18 processes signals received by receivers 24, 26 and signals to be transmitted by transmitter 28. Baseband section 18 also performs diversity combining of the received signals in diversity mode. Baseband section 18 may employ a variety of diversity combining techniques. Such diversity combining techniques may include Equal Gain Combining (EGC), Maximal Ratio Combining (MRC), Interference Rejection Combining (IRC), etc. Those skilled in the art will understand that other diversity combining techniques may also be applied to the present invention.

In one exemplary embodiment, baseband section 18 includes a generalized RAKE (GRAKE) receiver to diversity combine the received signals in diversity mode. GRAKE receiver 25 has manageable complexity and good performance in the presence of noise and interference. One advantage of a GRAKE receiver 25 is that it treats one or more antenna signals in the same way.

The following example illustrates the operation of a GRAKE receiver 25 in the present invention. Suppose that during a separate path searching process, GRAKE receiver 25 identifies channel path delays $\tau^A_0, \tau^A_1, \ldots$ on antenna 20, and $\tau^B_0, \tau^B_1, \ldots$ on antenna 22. Channel taps well known in the art of GRAKE receivers and corresponding to the above channel path delays are $c^A_0, c^A_1, \ldots$ and $c^B_0, c^B_1, \ldots$, and are placed in a vector c. For convenience, assume vector c is a column vector. GRAKE receiver 25 also estimates the corresponding noise correlation coefficients between taps on the same antenna, as well as across antennas 20, 22. These estimated noise correlation coefficients are placed in a matrix R, where the placement is consistent with the placement of the channel path delays in vector c.

GRAKE receiver 25 then computes combining weights w from vector c and correlation matrix R, according to Equation 1.

$$w = R^{-1}c \qquad \text{(Equation 1)}$$

Weights w are used to combine despread values $r^A_0, r^A_1, \ldots$ and $r^B_0, r^B_1, \ldots$ from antennas 20, 22 at the given path delays. The despread values are placed in a vector r, and the combined value is:

$$\gamma = w^H r, \qquad \text{(Equation 2)}$$

where $w^H$ is the transposition and complex conjugate of w. The combined value γ is processed further by baseband section 18, for instance by feeding it to the error control decoder.

Referring back to FIG. 1, controller 12 evaluates various parameters to select a receiver configuration that provides a desired performance for mobile terminal 10. In general, controller 12 selects a receiver configuration that is the least power consumptive and ensures a desired quality of service. In certain embodiments, the desired quality of service may be selected by the user or established by an application in the mobile terminal 10. For example, the user may specify a desired data rate, or an application may define a minimum data rate. Quality of service may also be determined by the system operator. For example, for voice applications, the system operator may specify a desired bit-error rate (BER) or frame error rate (FER).

Controller 12 may consider various factors to determine whether and when to change the current receiver configuration. These factors include the current state of the connection, the demands of an application currently running in the mobile terminal 10, and channel quality. These factors may be considered together in the decision process of controller 12, or in certain circumstances, one factor may predominate over the other factors. Based on predetermined decision criteria, controller 12 selects either single receiver mode or dual receiver diversity mode, and configures secondary receiver 26. For example, if mobile terminal 10 can obtain a desired performance with primary receiver 24 only, then controller 12 does not activate secondary receiver 26 and therefore conserves power. However, mobile terminal 10 may not be able to achieve a desired performance with primary receiver 24 alone. In this scenario, controller 12 activates secondary receiver 26. When the secondary receiver 26 is activated, controller 12 may selectively configure secondary receiver 26 to minimize power consumption while maintaining a desired quality of service.

One factor considered by controller 12 is the quality of the communication link. In determining whether to activate/deactivate or reconfigure secondary receiver 26, controller 12 may take into account various channel quality indicators. Channel quality indicators include carrier-to-interference ratios (C/I), bit error rate (BER), frame error rate (FER), a correlation matrix estimate, received signal strength indicator (RSSI), signal-to-noise ratio (SNR), and signal-to-interference ratio (SIR). By way of example, controller 12 may consider the SNR of the signal received by antennas 20, 22. If the SNR of secondary receiver 26 is low, controller 12 may deactivate secondary receiver 26, particularly when the SNR of the primary receiver 24 is high. In this case, improvement in performance due to the secondary receiver 26 may not be sufficient to warrant the additional power consumption. Conversely, if the SNR of secondary receiver 26 is high, controller 12 may activate secondary receiver 26, particularly when the SNR of primary receiver 24 is low. In this case, the improvement in performance would be significant, and would warrant the additional power consumption.

Further, controller 12 may predict the incremental performance impact due to activating or deactivating secondary receiver 26, and base its decision on the incremental performance difference. To predict the incremental performance difference, controller 12 can store a look-up table in memory 14 that provides a rough estimate of gain and loss for various values of the channel quality indicators. The estimates of gain or loss can be pre-computed based on models of the communication channel, or can be determined by averaging based on prior experience.

In the embodiment that includes GRAKE receiver 25, controller 12 may predict the performance of the GRAKE receiver 25 by computing the SNR of one or more antennas according to Equation 3.

$$SNR = \frac{\underline{w}^H \underline{c}\, \underline{c}^H \underline{w}}{\underline{w}^H R\, \underline{w}} \qquad \text{(Equation 3)}$$

The SNR calculated in Equation 3 provides a good predictor for the performance of GRAKE receiver 25. As shown in Equation 3, GRAKE receiver 25 balances the need to accumulate signal energy and suppress interference by treating the interference as colored noise, reflected in the correlation matrix R. The colored noise is whitened to suppress the correlated part of the noise.

Front-end controller 12 may also make a decision about how many taps to use from each antenna by computing the SNR of one or more antennas to for a given set of channel path delays, as described above. Further, front-end controller 12 may hypothesize a number of delay sets, including some that are only from antenna 20 or antenna 22. For example, suppose there are two delays from each of antenna 20 and antenna 22. Controller 12 may then compute the SNR for two delays from antenna 20, two from antenna 22, one delay from each antenna, all four delays from each antenna, etc. Typically, the maximum number of taps that the GRAKE receiver 25 is capable of combining is smaller than the number of candidates. As a result the receiver typically selects a subset. Using the GRAKE receiver 25 and the SNR estimation, front-end controller 12 can make a decision regarding switching antennas 20, 22 on or off, as described above. Further, using the SNR estimation, the front-end controller 12 can select a desired GRAKE receiver gain level based on the SNR estimation. Note the correlation matrix implicitly accounts for the gain level.

The demands of an application running on mobile terminal 10 is another factor considered by controller 12. For real-time applications, such as voice, which specify a minimum signal quality standard, secondary receiver 26 should be activated or reconfigured to improve performance only when needed to maintain minimum signal quality standards. For some multi-mode applications, e.g. the general packet radio service (GPRS) and enhanced GPRS (EGPRS) data modes of the GSM standard, or the high speed downlink packet access (HSDPA) data mode of the wideband code division multiple access (WCMDA) standard, secondary receiver 26 may be activated or reconfigured to obtain a higher level of service, or may be deactivated or reconfigured to drop back to a lower level of service to conserve power.

Figure 2:
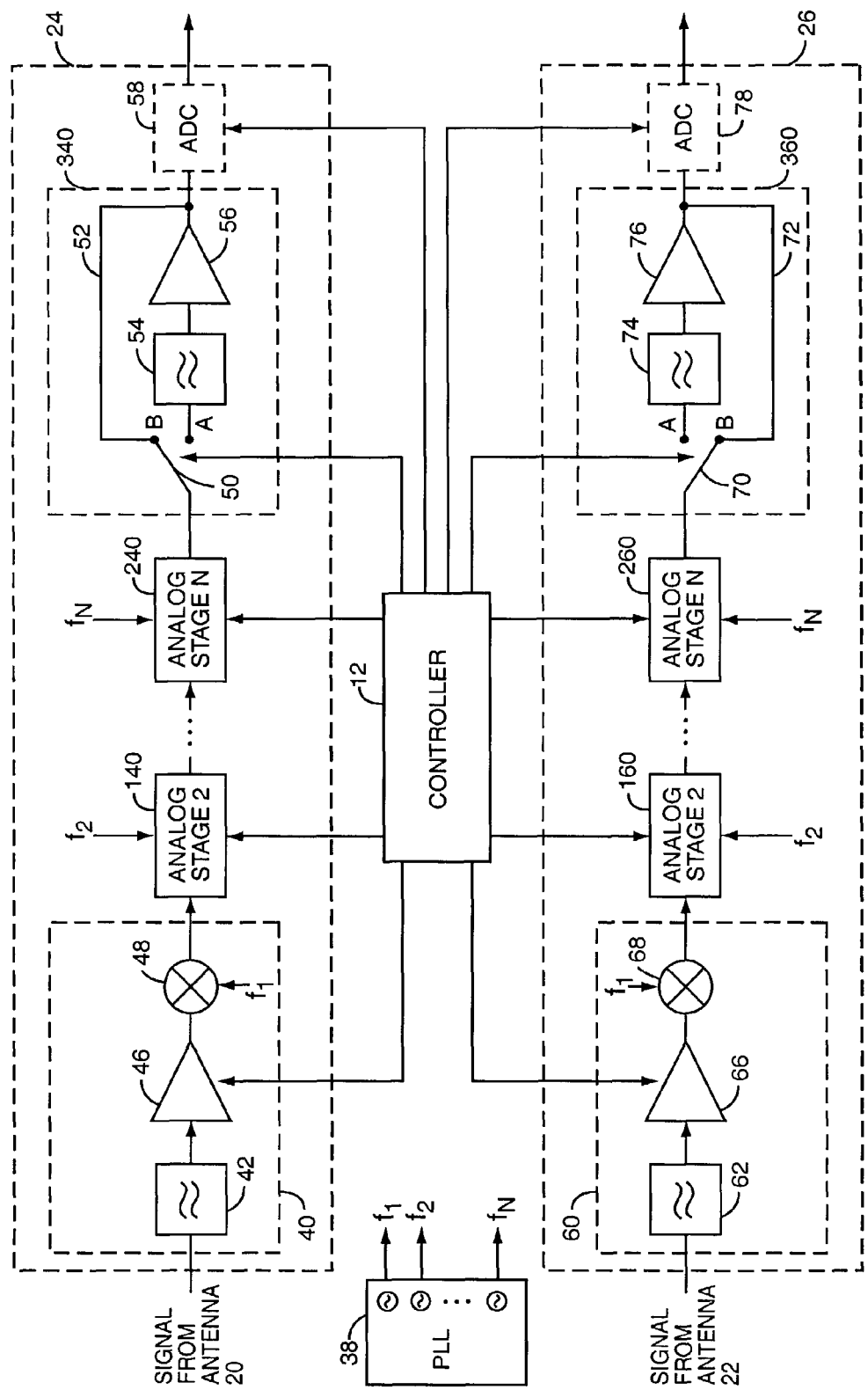
FIG. 2 illustrates a block diagram of the receivers of the mobile terminal.

FIG. 2 illustrates an exemplary block diagram of receivers 24, 26. For purposes of discussion, receiver 24 corresponds to a primary receiver and receiver 26 corresponds to a secondary receiver. However, controller 12 may designate receiver 26 as the primary receiver and receiver 24 as the secondary receiver.

Receiver 24 may include one or more amplifier stages 40, 140, 240, 340. The first amplifier stage 40 includes filter 42, low noise amplifier (LNA) 46, and a mixer 48 for downconverting the receive signal to a lower frequency. Amplifier stages 140, 240 may be constructed similar to stage 40. The final amplifier stage 340 includes switch 50, filter 54, amplifier 56, and bypass path 52. The output of the final amplifier stage 340 is connected to an analog to digital converter (ADC) 58.

The secondary receiver 26 may include multiple amplifier stages, such as amplifier stages 60, 160, 260, 360. The first amplifier stage 60 includes filter 62, low noise amplifier 66, and a mixer 68 to downconvert the received signal to a lower frequency. Amplifier stages 160 and 260 may be constructed similar to the first stage 60. The final amplifier stage 360 comprises switch 70, filter 74, amplifier 76, and bypass path 72. The output of the final amplifier stage 360 is connected to an analog-to-digital converter 78.

Mobile terminal 10 evaluates its performance and reconfigures the receivers 24, 26 depending upon its current performance. As previously noted, the controller 12 can activate/deactivate the secondary receiver 26 as needed. The controller 12 can also change the configuration of either the primary receiver 24 or the secondary receiver 26 to change the gain of the receivers 24, 26. In general, increasing the gain improves performance at the expense of greater power consumption, while reducing gain reduces power consumption at the expense of performance degradation. FIG. 2 illustrates some of the ways in which receivers 24, 26 can be reconfigured to vary the gain of the receivers 24, 26.

One method of reconfiguring the receivers 24, 26 is to bypass components in the receive chain. As shown in FIG. 2, switches 50, 70 are movable from a first position (position A) to a second position (position B). In position A, switches 50, 70 route the received signal through filters 54, 74 and amplifiers 56, 76. When switches 50, 70 are moved to the second position, the received signal bypasses filters 54, 74 and amplifiers 56, 76 respectively. Switches 50, 70 may be actuated independently, providing independent control of the configuration of receivers 24, 26.

Another method of reconfiguring receivers 24, 26 is to use one or more variable gain amplifiers in the receive chain that are controlled by controller 12. For example, the low noise amplifiers 46, 66 shown in FIG. 2 may be variable gain amplifiers. For many types of LNAs, gain varies proportionally with the supply power. Thus, reducing the supply power to amplifier 46, 66 reduces the gain. Therefore, controller 12 can regulate the secondary receiver gain by regulating the gain of one or more amplifiers 46, 66 so that receiver 26 consumes only the power necessary to achieve a desired performance. Those skilled in the art will recognize that reducing the gain of amplifier 66 also reduces the SNR at the output of amplifier 66. Therefore, the gain should be reduced only when there is sufficient performance margin. Further, those skilled in the art will appreciate that the gain of primary receiver 24 may be controlled in a similar manner.

Figure 3A:
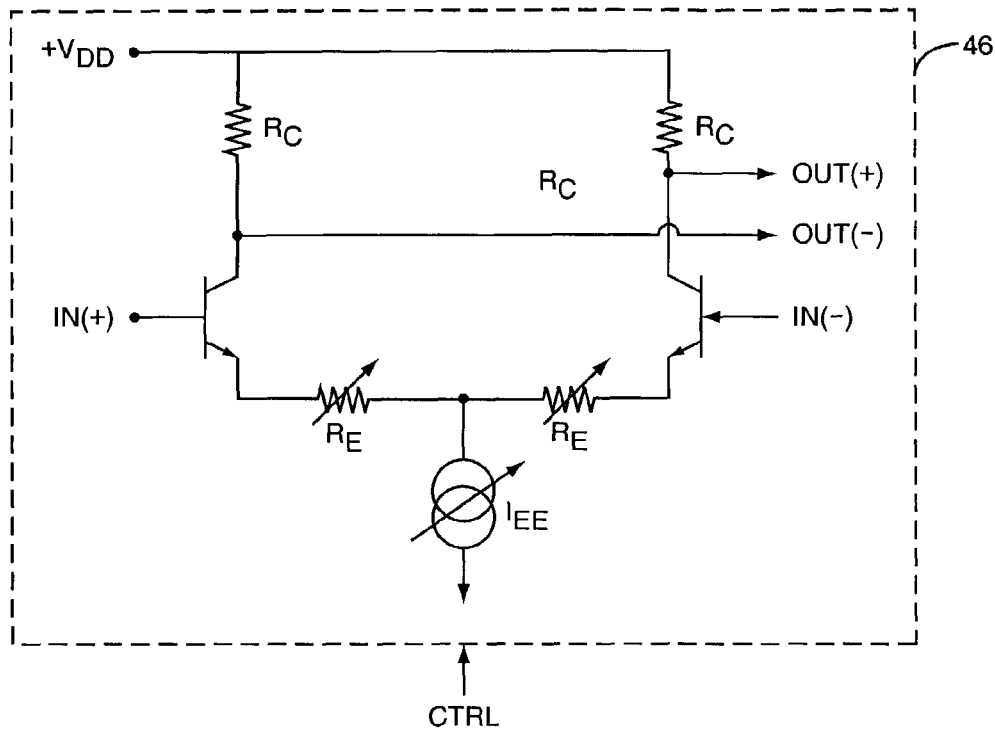
FIGS. 3A & 3B illustrate exemplary amplifier implementations.

FIG. 3A illustrates an exemplary amplifier configuration for amplifier 46. Amplifier 66 may be constructed in the same fashion. Amplifier 46 includes resistors $R_C$, variable resistors $R_E$, bipolar junction transistors (BJT), and a current source $I_{EE}$. Equations 4A and 4B characterize the gain and linearity of amplifier 46.

$$G_V = \frac{I_{EE} \cdot R_C}{2 \cdot V_T + I_{EE} \cdot R_E} \quad \text{(Eq. 4A)}$$

$$V_{IIP3} = V_T \cdot \sqrt{2 \cdot \left(2 + \frac{I_{EE} R_E}{V_T}\right)^3} \quad \text{(Eq. 4B)}$$

In Equations 4A and 4B, $V_T$ represents the thermal voltage. As seen in the above equations, holding $I_{EE}R_E$ constant while scaling the gain maintains the linear operating mode of the amplifier 46. Therefore, varying $I_{EE}$ and $R_E$ scales the gain of amplifier 46 according to equations 5A and 5B.

$$\frac{G_2}{G_1} = \frac{I_{E2}}{I_{E1}} \quad \text{(Eq. 5A)}$$

$$\frac{R_{E2}}{R_{E1}} = \frac{I_{E1}}{I_{E2}} \quad \text{(Eq. 5B)}$$

Further, by scaling the gain while keeping the linearity constant, power consumption scales according to Equation 6.

$$P_2 = P_1 \cdot \frac{G_2}{G_1} \quad \text{(Eq. 6)}$$

While amplifier 46 shown in FIG. 3A uses BJTs, the explanation above applies equally well to metal/insulator/semiconductor field effect transistors (MOSFETs), which are typically used for low-noise amplifiers (LNAs) in a signal path with a mixer. Further, these basic principles can also be applied to analog baseband amplifiers.

Figure 3B:
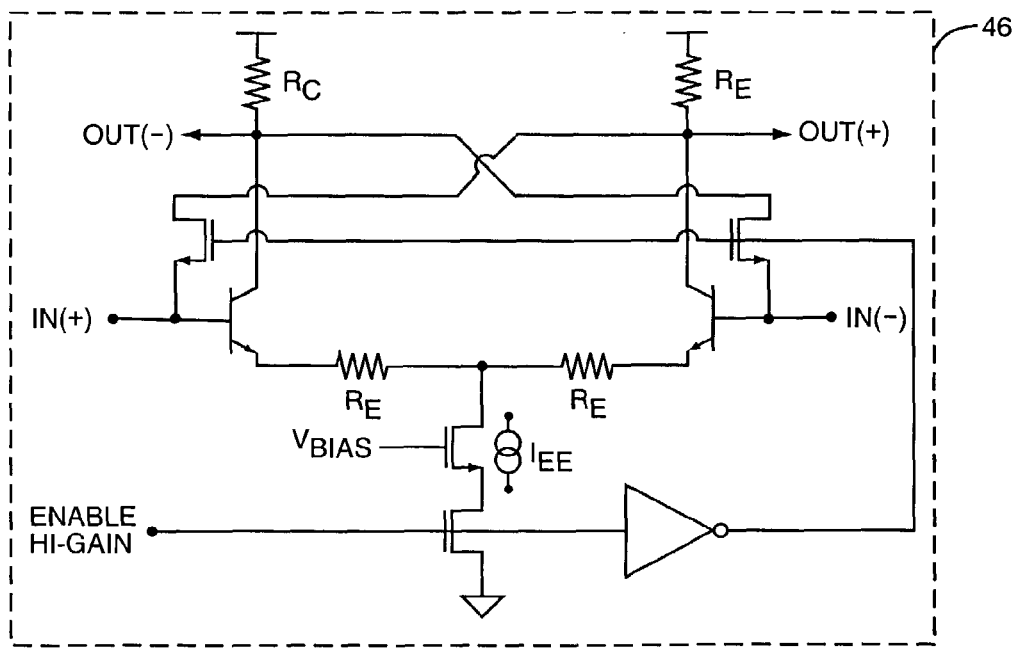

FIG. 3B illustrates another exemplary amplifier configuration for amplifier 46 where a control signal activates/deactivates amplifier 46. In this configuration, amplifier 46 has a gain and power consumption according to Equations 7 and 8, respectively.

$$G = \begin{cases} \frac{I_{EE} R_C}{2 V_T + I_{EE} R_E}, & \text{when Enable Hi-Gain} = 1 \\ 1, & \text{when Enable Hi-Gain} = 0 \end{cases} \quad \text{(Eq. 7)}$$

$$P_{DD} = \begin{cases} I_E \cdot V_{DD}, & \text{when Enable Hi-Gain} = 1 \\ 0, & \text{when Enable Hi-Gain} = 0 \end{cases} \quad \text{(Eq. 8)}$$

As seen in the above equations, amplifier 46 has unity gain when deactivated, and therefore does not require a bypass path. Although FIGS. 3A and 3B illustrate amplifier 46 of primary receiver 24, these configurations may be used for any amplifier in the primary and secondary receivers 24, 26.

Figure 4A:
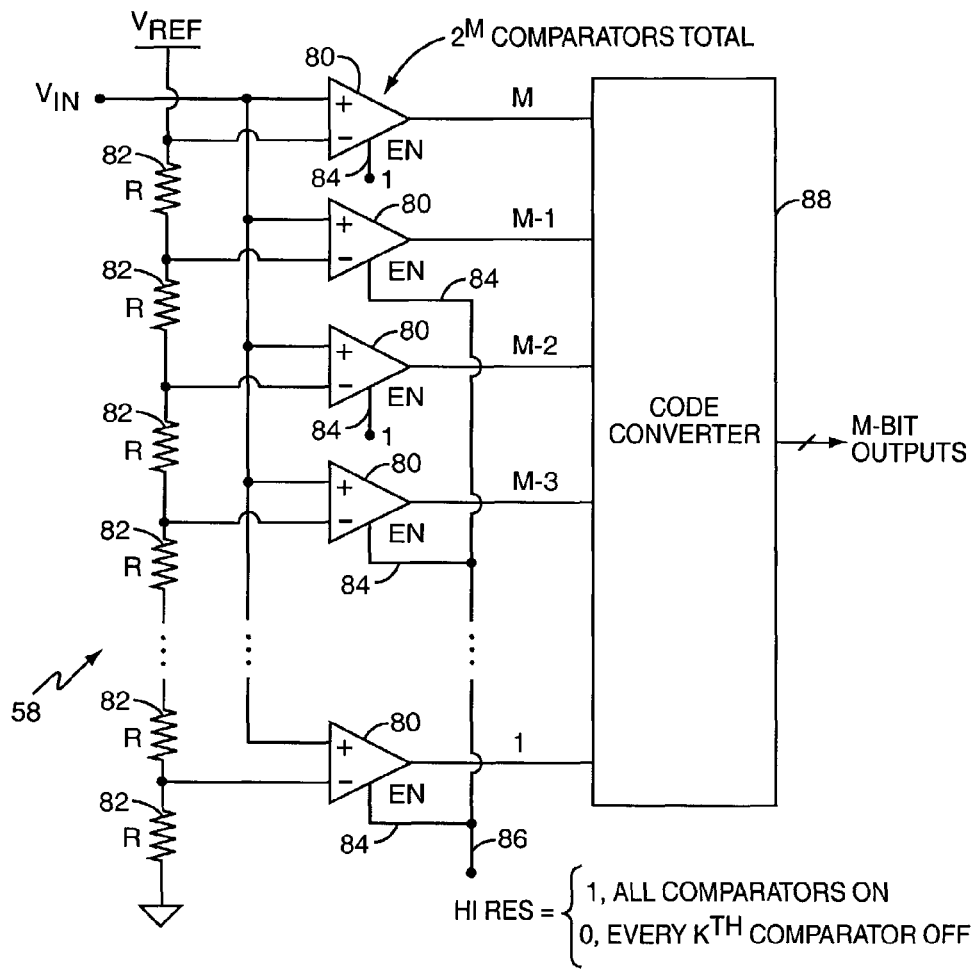
FIG. 4A illustrates an exemplary A/D implementation.
Figure 4B:
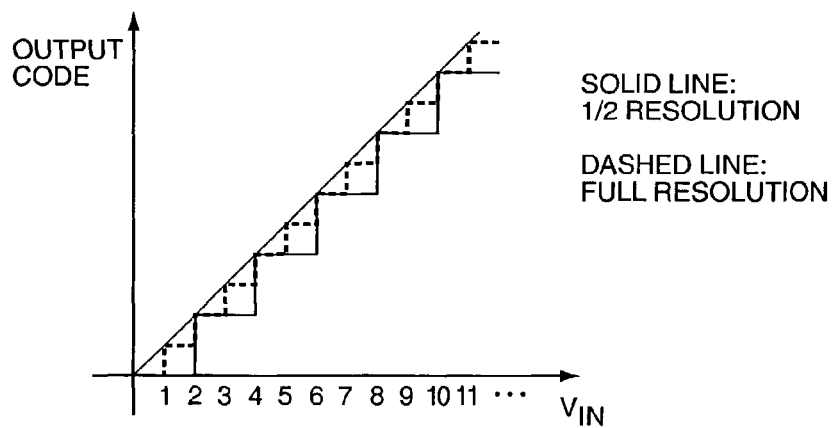
FIG. 4B illustrates resolution vs. power consumption of the A/D of FIG. 4A.

For receivers with digital outputs, receivers 24, 26 may include an ADC 58, 78 and additional filtering (not shown). Another way to change the gain of receivers 24, 26 is to change the operating parameters of ADC 58, 78. FIGS. 4A and 4B illustrate an exemplary embodiment for ADC 58. While not shown, this configuration also applies to ADC 78 in secondary receiver 24. ADC 58 may comprise a chain of comparators 80, each with a corresponding resistor 82 and enable line 84, where each comparator 80 is driven by the output of amplifier 56 ($V_{in}$) and by a reference voltage ($V_{ref}$). Half of the enable lines 84 of comparators 80 are enabled while the other half of enable lines 84 are tied to a Hi Res control line 86. The output of each comparator 80 feeds a code converter 88 to convert flash, pipeline, or successive approximation converter output signals to binary format. When high ADC resolution is required, the Hi Res control line 86 is set to 1, enabling all comparators 80. When a lower resolution is acceptable, disabling half of the comparators 80 by setting the Hi Res control line 86 to 0, reduces the resolution of ADC 58 by 1-bit, and effectively reducing the power consumption of ADC 58. When the ADC 58 comprises a flash converter, power consumption in the ADC 58 is reduced by 50% for each 1-bit reduction in resolution, as shown in FIG. 4B. In the case of successive approximation converters, power consumption is approximately proportional to the required resolution in bits. Pipeline converters allow for power savings in between these two cases.

Figure 5:
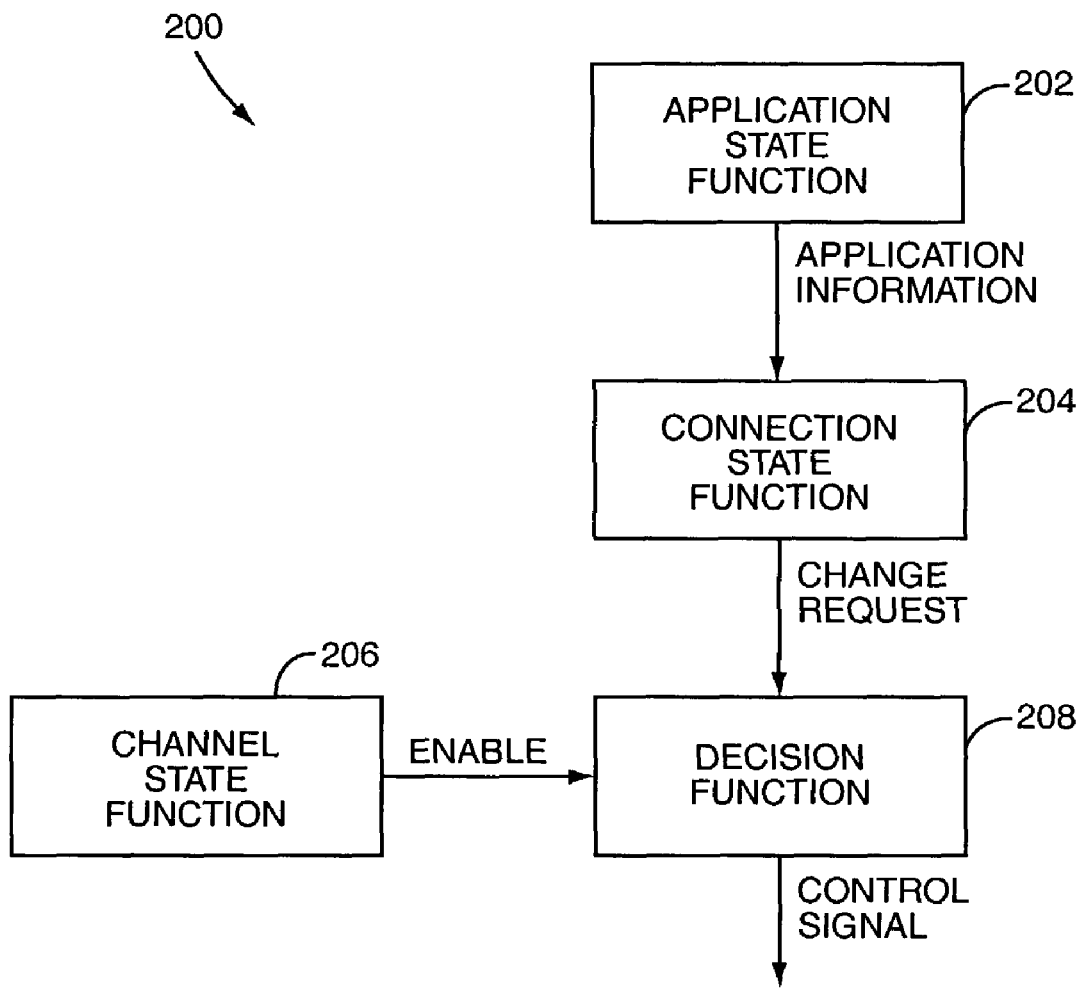
FIG. 5 illustrates a flow chart regarding the operation of the mobile terminal in FIG. 1.

FIG. 5 is a functional block diagram 200 of the decision logic for the controller 12. The decision logic may be implemented in software, hardware, firmware, or a combination of the above. In the embodiment shown in FIG. 6, the control logic includes three state functions 202, 204, 206 to determine respectively the state of the application, the state of the connection, and the state of the channel. The application state function 202 determines the state of the application. As an example, the application state function 202 may determine the type of application and the constraints on the communication channel imposed by an application.

The connection state function 204 determines whether to change the current configuration of the receivers 24, 26 depending upon the current state of the connection and application information from the application state function. The connection state function 204 determines whether to turn the secondary receiver 26 on or off, or to reconfigure the secondary receiver to change the gain of the secondary receiver 26, and outputs a change request to a decision function 208 when the connection state function determines to change the current receiver configuration or operating parameters.

Figure 6A:
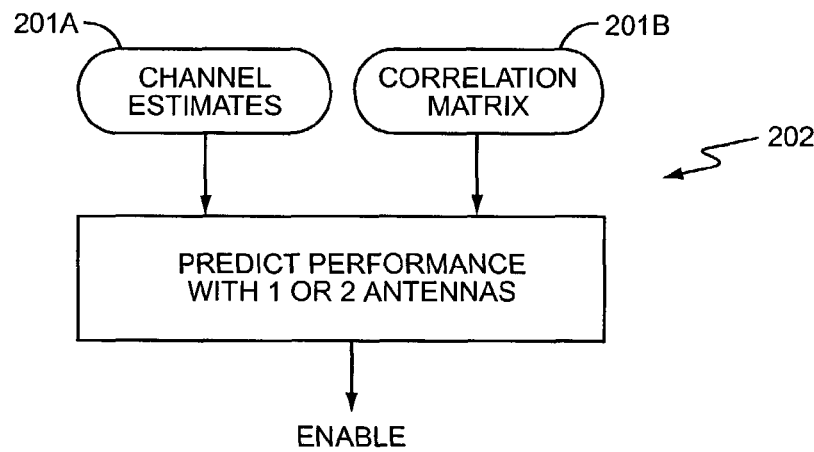
FIG. 6 illustrates step details corresponding to the flow chart of FIG. 5.
Figure 6B:
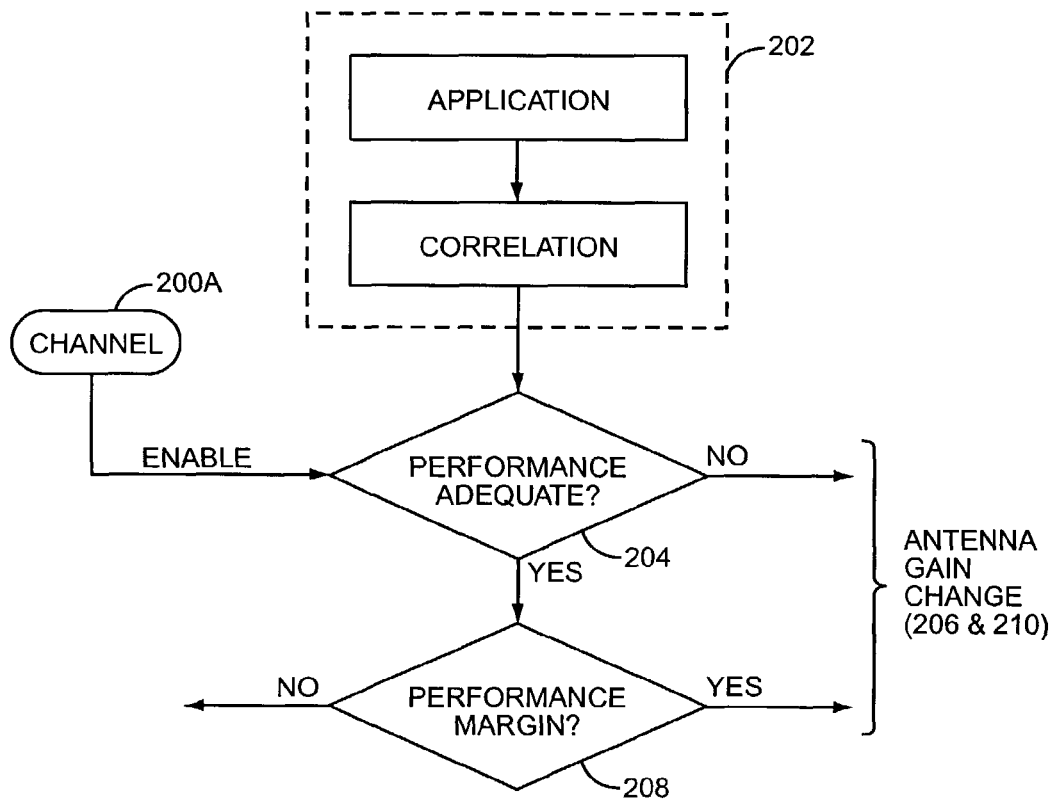

The channel state function 206 determines the performance increase that is expected by operating the secondary receiver 26 at various gain levels. FIG. 6 is a functional block diagram of the decision logic for the channel state function 206. As shown in FIG. 6, the channel state function 206 estimates the performance of the mobile terminal 10 with one receiver chain activated and with two receiver chains activated. The channel state logic 206 may also take into account different gain levels for the secondary receiver 26. The channel state function predicts performance of the receiver (block 210) based on channel state information (block 212), e.g., an estimate of the channel, and a correlation matrix (block 214). The predictions made by the channel state function 206 may take the form of estimated performance metrics. The channel state function 206 then uses the performance metrics to determine whether the performance increase attributed to turning on or increasing the gain of the secondary receiver 26 is worth the additional power consumption. If so, the channel state function 206 generates an enable signal that is supplied to the decision function 208. If not, the channel state function 206 turns off the enable signal if the enable signal is already on to disable any changes that would increase power consumption.

The decision function 208 generates control signals to change the receiver configuration depending on the signals from the connection state function 204 and channel state function 206. If the decision function 208 receives a change request from the connection state function 204, the decision function 208 will either implement the requested change or ignore the request depending upon the state of the enable signal. The enable signal may be implemented, for example, as a flag that is turned on and off by the channel state function 208. If the connection state function 206 requests that the secondary receiver 26 be turned on, or that the gain of the secondary receiver 26 be increased, the decision function 208 implements the request only if the enable flag is set. If the enable flag is not set, the decision function 208 ignores the change request. If the connection state function 206 requests that the secondary receiver be turned off, or that the gain of the secondary receiver 26 be reduced, the decision function 208 may implement the change request without regard to the state of the enable signal. The decision function 208 could further include logic for responding to changes in the state of the enable signal. For example, when the enable signal transitions from "on" to "off," the decision function 208 may be programmed to turn off the secondary receiver 26 responsive to the transition.

Figure 7A:
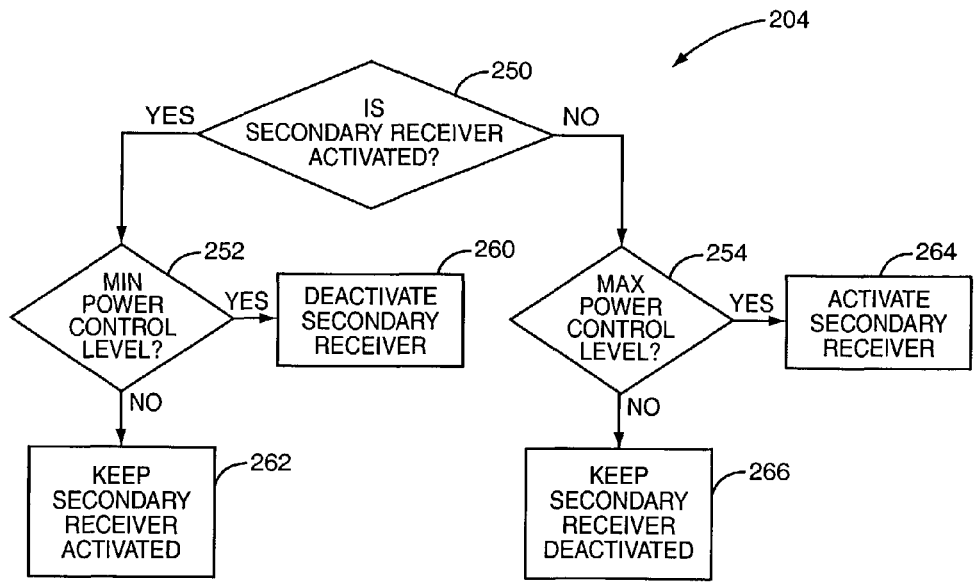
FIGS. 7A & 7B illustrate decision details regarding antenna activation.
Figure 7B:
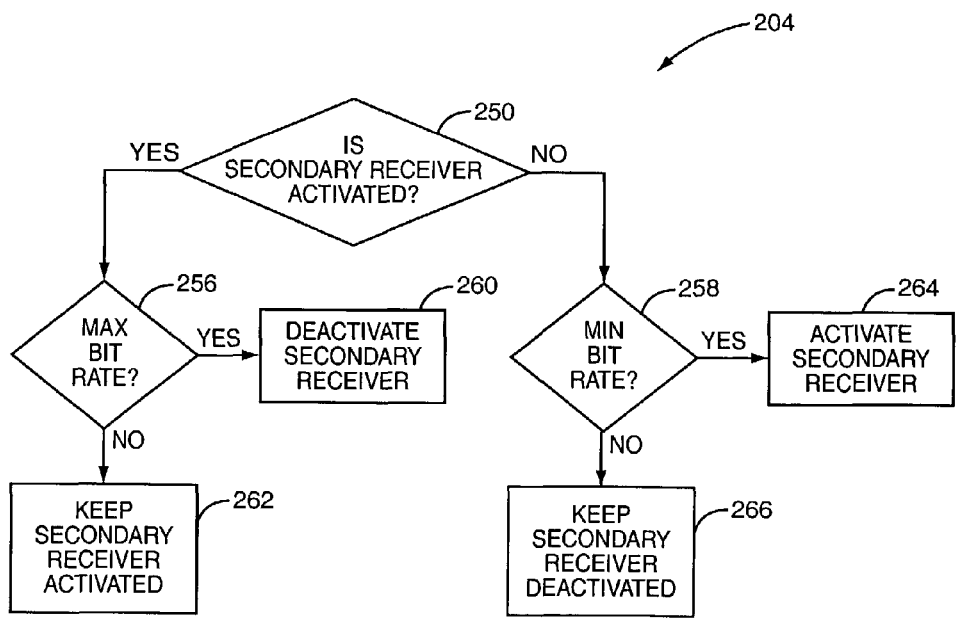
Figure 8A:
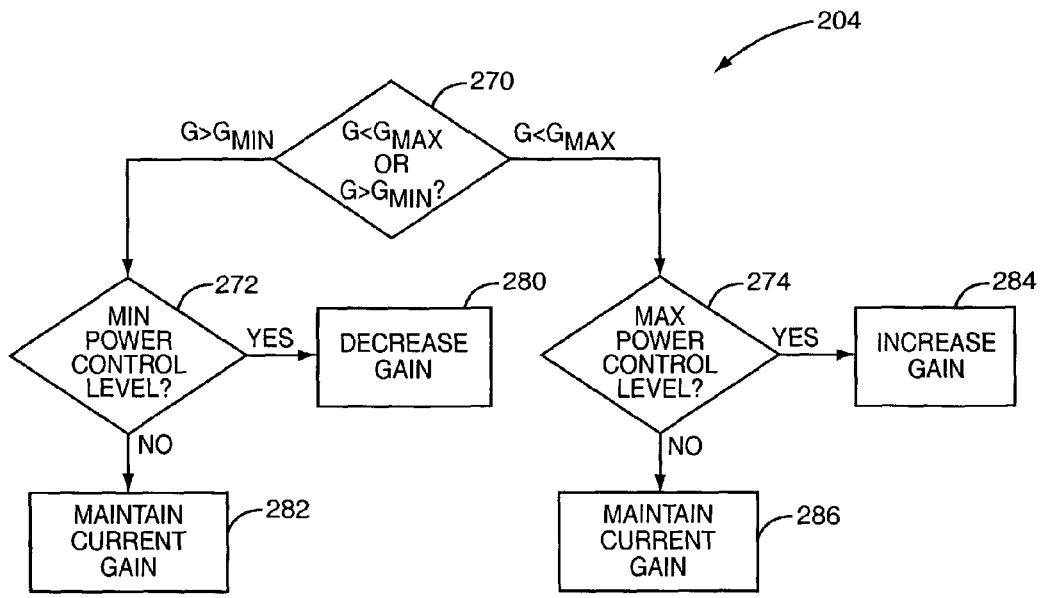
FIGS. 8A & 8B illustrate decision details regarding gain adjustment.

FIGS. 7A, 7B, 8A, and 8B show logic diagrams illustrating various routines that may be implemented by the connection state function 204. FIGS. 7A and 8A illustrate exemplary methods for determining receiver configuration based on power control level. The connection state function 204 may monitor the current power control level. If the current power control level is near the limits of the power control, i.e., near the highest power control level, and mobile terminal 10 is in danger of losing its connection or violating performance criterion, connection state function may activate secondary receiver 26 and/or reconfigure the primary and secondary receiver configurations to improve performance. Conversely, when mobile terminal 10 is operating well below the maximum power control level, controller 12 may deactivate or reconfigure secondary receiver 26 and/or primary receiver 24 to reduce power consumption.

In FIG. 7A, when secondary receiver 26 is inactive (block 250), controller 12 activates secondary receiver 26 (block 264) if the power control level is at a maximum (block 254) and maintains the inactive status of secondary receiver 26 (block 266) if the power control level is not at a maximum (block 254). When secondary receiver 26 is active (block 250), controller 12 deactivates secondary receiver 26 (block 260) if the power control level is at a minimum (block 252) and maintains the active status of secondary receiver 26 (block 262) if the power control level is not at a minimum (block 252).

In FIG. 8A, when the secondary receiver gain is less than the maximum receiver gain (block 270), controller 12 increases the secondary receiver gain (block 284) if the power control level is at a maximum (block 274) and maintains the current secondary receiver gain (block 286) if the power control level is not at a maximum (block 274). When the secondary receiver gain is greater than the minimum receiver gain (block 270), controller 12 decreases the secondary receiver gain (block 280) if the power control level is at a minimum (block 272) and maintains the current secondary receiver gain (block 282) if the power control level is not at a minimum (block 272).

Figure 8B:
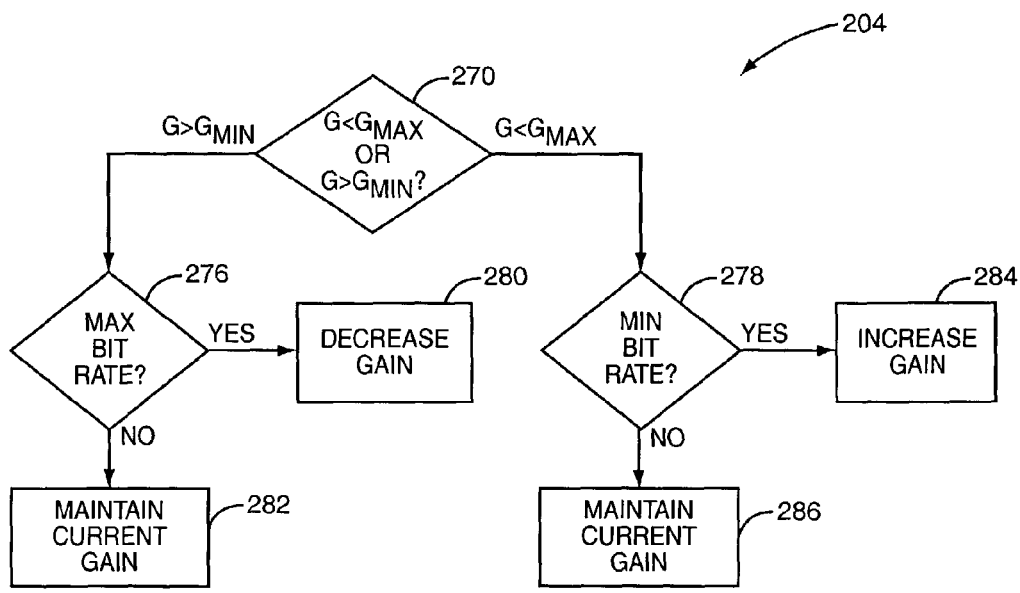

FIGS. 7B and 8B illustrate exemplary routines implemented by the connection state function 204 in mobile terminal 10 that is rate-controlled. The idea behind rate control is to keep the power control level constant and to adjust the data rate to maximize data throughput at the fixed power level. When mobile terminal 10 is operating near the lowest allowable data rate, secondary receiver 26 may be activated or reconfigured to improve performance. Conversely, when mobile terminal 10 is well-above the minimum data rate, secondary receiver 26 may be deactivated or reconfigured to reduce power consumption.

In FIG. 7B, when secondary receiver 26 is inactive (block 250), controller 12 activates secondary receiver 26 (block 264) if the data rate is at a minimum (block 258) and maintains the inactive status of secondary receiver 26 (block 266) if the data rate is not at a minimum (block 258). When secondary receiver 26 is active (block 250), controller deactivates secondary receiver (block 260) if the data rate is at a maximum (block 256) and maintains the active status of secondary receiver 26 (block 262) if the data rate is not at a maximum (block 256).

In FIG. 8B, when the secondary receiver gain is less than the maximum receiver gain (block 270), controller 12 increases the secondary receiver gain (block 284) if the data rate is at a minimum (block 278) and maintains the current secondary receiver gain (block 286) if the data rate is not at a minimum (block 278). When the secondary receiver gain is greater than the minimum receiver gain (block 279), controller 12 decreases the secondary receiver gain (block 280) if the data rate is at a maximum (block 276) and maintains the current secondary receiver gain (block 282) if the data rate is not at a maximum (block 276).

It will be obvious to one skilled in the art that various other control options not discussed herein may also be implemented to achieve a desired performance with minimal power consumption. Such options may include control of amplifiers 56, 76, control of the filters 54, 74 (e.g., changing filter coefficients), and control of the digital signal processor(s) (not shown) in baseband section 18. For example, power may be conserved in the digital signal processors by dynamically reducing the complexity of the digital channel selection filter.

The present invention may, of course be carried out in other specific ways than those herein set forth without departing from the spirit and essential characteristics of the invention. The present embodiments are, therefore, to be considered in all respects as illustrative and not restrictive. All changes coming within the meaning and equivalency range of the appended claims are intended to be embraced therein.

What is claimed is:

1. A portable wireless device in a wireless network comprising:
   a front-end comprising a primary antenna operatively connected to a primary receiver and a secondary antenna operatively connected to a secondary receiver; and
   a front-end controller to select the primary receiver for operation in a single receiver mode and the primary receiver in combination with the secondary receiver for operation in a dual receiver diversity mode, and further to selectively vary the gain of the secondary receiver when operating in the dual receiver diversity mode by bypassing at least one circuit element in the secondary receiver to maintain a desired performance level and to reduce power consumption.

2. The portable wireless device of claim 1 wherein the front-end controller selectively varies the gain of the primary receiver.

3. The portable wireless device of claim 1 wherein the front-end controller selectively varies the gain of the secondary receiver by bypassing at least one amplifier.

4. The portable wireless device of claim 1 wherein the front-end controller selectively varies the gain of the secondary receiver by bypassing at least one filter.

5. The portable wireless device of claim 1 wherein the front-end controller further selectively varies the gain of the secondary receiver by selectively turning the secondary antenna on or off.

6. The portable wireless device of claim 1 wherein the desired performance is based on at least one of an application running on the portable electronic device, channel quality indicators, and a current state of a connection.

7. The portable wireless device of claim 6 wherein the channel quality indicators include at least one of a channel estimate, a correlation matrix estimate, a bit error rate (BER), a frame error rate (FER), a received signal strength, and an SNR estimate.

8. The portable wireless device of claim 1 wherein the front-end controller further selectively varies the gain of the secondary receiver based on a battery power level of the portable wireless device.

9. The portable wireless device of claim 1 wherein the front-end controller interchanges the primary and secondary receivers.

10. The portable wireless device of claim 1 further comprising a baseband section including a GRAKE receiver for performing diversity combining when operating in the dual receiver diversity mode.

11. A method for improving the performance of a portable wireless device in a wireless network, the portable wireless device comprising a front-end and a front-end controller, wherein the front-end comprises a primary antenna operatively connected to a primary receiver and a secondary antenna operatively connected to a secondary receiver, the method comprising:
   activating the primary receiver for operation in a single receiver mode;
   activating the primary receiver in combination with the secondary receiver for operation in a dual receiver diversity mode; and
   selectively varying the gain of the secondary receiver when operating in the dual receiver diversity mode by bypassing at least one circuit element in the secondary receiver to maintain a desired performance and to reduce power consumption.

12. The method of claim 11 wherein selectively varying the gain of the secondary receiver further comprises varying the supply current of one or more amplifiers in the secondary receiver.

13. The method of claim 11 wherein bypassing at least one circuit element comprises bypassing at least one amplifier.

14. The method of claim 11 wherein bypassing at least one circuit element comprises bypassing at least one filter.

15. The method of claim 11 wherein selectively varying the gain of the secondary receiver further comprises selectively activating or deactivating the secondary antenna.

16. The method of claim 11 further comprising selectively varying the gain of the secondary receiver based on at least one of an application running on the portable electronic device, channel quality indicators, and a current state of a connection.

17. The method of claim 16 wherein the channel quality indicators include at least one of a channel estimate, a correlation matrix estimate, a bit error rate (BER), a frame error rate (FER), a received signal strength, and an SNR estimate.

18. The method of claim 11 further comprising interchanging the primary and secondary receivers with the front-end controller.

19. The method of claim 11 further comprising performing diversity combining in a baseband section connected to said front-end when operating in said dual receiver diversity mode, said baseband section comprising a GRAKE receiver.

20. A portable wireless device in a wireless network comprising:
a front-end comprising a primary antenna operatively connected to a primary receiver and a secondary antenna operatively connected to a secondary receiver; and
a front-end controller to select the primary receiver for operation in a single receiver mode and the primary receiver in combination with the secondary receiver for operation in a dual receiver diversity mode, and further to selectively vary the gain of the secondary receiver when operating in the dual receiver diversity mode by adjusting the complexity of at least one filter to maintain a desired performance level and to reduce power consumption.

21. A portable wireless device in a wireless network comprising:
a front-end comprising a primary antenna operatively connected to a primary receiver and a secondary antenna operatively connected to a secondary receiver; and
a front-end controller to select the primary receiver for operation in a single receiver mode and the primary receiver in combination with the secondary receiver for operation in a dual receiver diversity mode, and further to selectively vary the gain of the secondary receiver when operating in the dual receiver diversity mode by adjusting the sampling rate of an analog-to-digital converter to maintain a desired performance level and to reduce power consumption.

22. A portable wireless device in a wireless network comprising:
a front-end comprising a primary antenna operatively connected to a primary receiver and a secondary antenna operatively connected to a secondary receiver; and
a front-end controller to select the primary receiver for operation in a single receiver mode and the primary receiver in combination with the secondary receiver for operation in a dual receiver diversity mode, and further to selectively vary the gain of the secondary receiver when operating in the dual receiver diversity mode by adjusting the sampling resolution of an analog-to-digital converter to maintain a desired performance level and to reduce power consumption.

23. A portable wireless device in a wireless network comprising:
a front-end comprising a primary antenna operatively connected to a primary receiver and a secondary antenna operatively connected to a secondary receiver; and
a front-end controller to select the primary receiver for operation in a single receiver mode and the primary receiver in combination with the secondary receiver for operation in a dual receiver diversity mode, and further to selectively vary the gain of the secondary receiver when operating in the dual receiver diversity mode based on a battery power level of the portable wireless device to maintain a desired performance level and to reduce power consumption.

24. A method for improving the performance of a portable wireless device in a wireless network, the portable wireless device comprising a front-end and a front-end controller, wherein the front-end comprises a primary antenna operatively connected to a primary receiver and a secondary antenna operatively connected to a secondary receiver, the method comprising:
activating the primary receiver for operation in a single receiver mode;
activating the primary receiver in combination with the secondary receiver for operation in a dual receiver diversity mode; and
selectively varying the gain of the secondary receiver when operating in the dual receiver diversity mode by adjusting the complexity of at least one filter to maintain a desired performance and to reduce power consumption.

25. A method for improving the performance of a portable wireless device in a wireless network, the portable wireless device comprising a front-end and a front-end controller, wherein the front-end comprises a primary antenna operatively connected to a primary receiver and a secondary antenna operatively connected to a secondary receiver, the method comprising:
activating the primary receiver for operation in a single receiver mode;
activating the primary receiver in combination with the secondary receiver for operation in a dual receiver diversity mode; and
selectively varying the gain of the secondary receiver when operating in the dual receiver diversity mode by disabling one or more components of an analog-to-digital converter to maintain a desired performance and to reduce power consumption.

26. A method for improving the performance of a portable wireless device in a wireless network, the portable wireless device comprising a front-end and a front-end controller, wherein the front-end comprises a primary antenna operatively connected to a primary receiver and a secondary antenna operatively connected to a secondary receiver, the method comprising:
activating the primary receiver for operation in a single receiver mode;
activating the primary receiver in combination with the secondary receiver for operation in a dual receiver diversity mode; and
selectively varying the gain of the secondary receiver when operating in the dual receiver diversity mode by adjusting at least one of a level and a sampling rate of an analog-to-digital converter to maintain a desired performance and to reduce power consumption.

27. A method for improving the performance of a portable wireless device in a wireless network, the portable wireless device comprising a front-end and a front-end controller, wherein the front-end comprises a primary antenna operatively connected to a primary receiver and a secondary antenna operatively connected to a secondary receiver, the method comprising:
activating the primary receiver for operation in a single receiver mode;
activating the primary receiver in combination with the secondary receiver for operation in a dual receiver diversity mode; and
selectively varying the gain of the secondary receiver when operating in the dual receiver diversity mode based on a battery power level of the portable wireless device to maintain a desired performance and to reduce power consumption.

* * * * *